L. H. MONTROSS.
Car-Axle Box.
No. 211,251.              Patented Jan. 7, 1879.
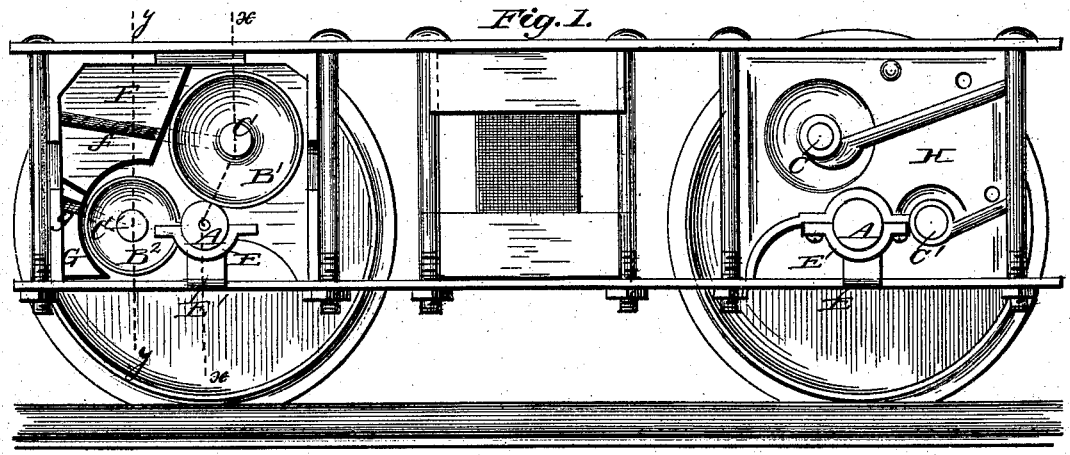
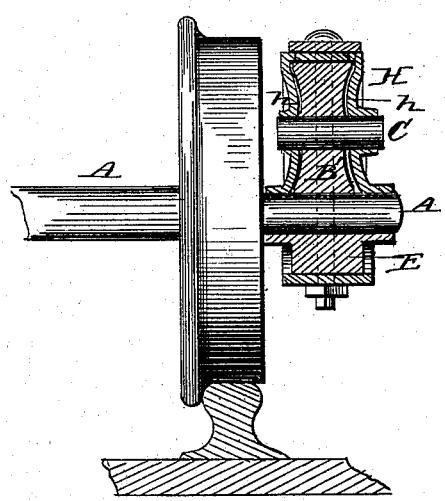
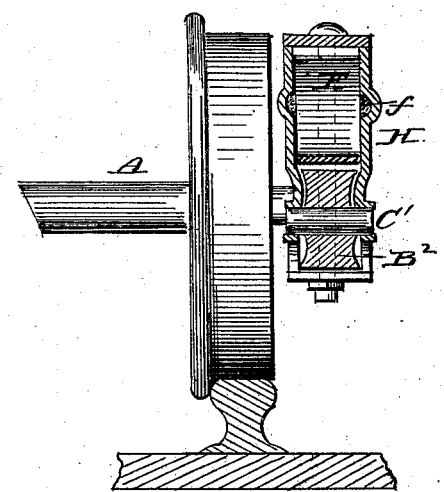

UNITED STATES PATENT OFFICE.

LEVI H. MONTROSS, OF SIMCOE, ONTARIO, CANADA.

IMPROVEMENT IN CAR-AXLE BOXES.

Specification forming part of Letters Patent No. 211,251, dated January 7, 1879; application filed August 22, 1878.

*To all whom it may concern:*

Be it known that I, LEVI H. MONTROSS, of Simcoe, in the county of Norfolk, Province of Ontario, and Dominion of Canada, have invented certain new and useful Improvements in Railway-Car Axle-Boxes; and I do hereby declare that the following is a full, clear, and exact description thereof, which will enable others skilled in the art to which it appertains to make and use it, reference being had to the accompanying drawings, which form a part of this specification, and in which—

Figure 1 is a side elevation of a railway-car truck embodying my improvement, the covering-plate of one of the boxes having been removed to show the interior construction; and Figs. 2 and 3 represent cross-sections on the lines indicated by $x$ $x$ and $y$ $y$, respectively.

Similar letters of reference indicate corresponding parts in all the figures.

My invention relates to that class of axle-boxes in which friction-wheels are employed in combination with the car-axle; and it consists, broadly, in the combination of a single bearing-wheel, set obliquely to the axle, with the axle and with a shoulder or abutment wheel, substantially as hereinafter more fully described, and pointed out in the claims.

In the drawings, A is the axle or journal; $B^1$, the upper or bearing wheel, and $B^2$ the shoulder or abutment wheel.

As will be seen by reference to Fig. 1 of the drawings, the axle C of wheel $B^1$ is journaled in bearings in the box or casing H, which are set to one side of, and not vertically over, the car-axle A.

I have found by experiment that an angle of about fifteen degrees from the vertical center line of A is the most suitable; but this may be varied as circumstances may render desirable without deviating from the spirit of my invention.

The face of wheel $B^1$, which should be provided with a broad tread, bears against axle A, and is set close to but not in contact with the broad periphery or tread of the abutment-wheel $B^2$, of smaller diameter, the shaft $C'$ of which is journaled in boxes in each side or face plate of the casing H.

The arrangement of the two wheels $B^1$ and $B^2$ relative to the axle will be understood by reference to Fig. 1 of the drawings. By placing wheel $B^1$ in the manner stated—that is, far enough to one side to give axle A a natural inclination against wheel $B^2$—it will be observed that the actual weight or pressure upon wheel $B^2$ will be very slight, while the oblique pressure on $B^1$ is likewise very slight, so that the oblique pressure of the superimposed weight of the truck and car against the axle, as compared with axles placed between two bearing-wheels placed equally distant from a vertical line passing through the center of the axle, in the manner heretofore practiced, is greatly reduced.

The box or casing H is preferably made in two parts or sections, bolted together, and of such a width that the friction-wheels $B^1$ $B^2$ shall run easily within it, and without contact with or friction against its sides. Each of the two sections of the box H is made convex on its inner face around the centers of the journals or boxes for the shafts C $C'$, this convexity projecting inwardly into the annular space formed between the broad tread-flanges of wheels $B^1$ and $B^2$ and their narrow disks or bodies, as represented in Fig. 2, so that shafts C $C'$ will have a long bearing-surface without extending too far outside of casing H. Each of the shafts C $C'$ has a covering plate or cap over their ends, said caps being suitably secured to or forming a part of the casing-plates H, to prevent the ingress of dust or dirt into the journals.

Casing H is strengthened by the stirrup or half-boxing E, which is secured upon and forms a web or cross-piece between both of the plates H around the under side of axle A, with which, however, it is not in frictional contact. By this half-boxing E the axle is prevented from displacement if the car should jump the track or otherwise be suddenly and violently moved, and by its downward extension $E'$, which is saddled upon the lower cross-piece of the casings H, a web is formed uniting the inner faces of the two casing-plates, and which forms an abutment for the hub of the car-wheel on each side, which will prevent side play or lateral motion of the axles.

F and G denote oil-reservoirs, which are arranged within the casing H, and communicate with the boxes in which the journals C C' are journaled by means of ducts $f\ g$. If desired, a wick or other capillary matter may be inserted into these ducts for the purpose of feeding the lubricant to the boxes; or they may be used without such feeding device, according to the nature or construction of the casing H. In either case the oil-ducts $f\ g$ should be made straight, so that a rod or other suitable implement may be inserted for the purpose of cleansing them out whenever required, or for the insertion or removal of the wick if the ducts are used with such.

I am well aware that axle-boxes have been made heretofore in which friction-wheels have been employed, which were set to one side of or oblique to the axle or journal of the car-wheel; but by this arrangement, as heretofore constructed, two or more friction-wheels have been employed, which have been set at corresponding or equal inclinations to the car-axle, thereby giving their axles not only the direct or vertical pressure to sustain, but besides an oblique pressure on each side of the center.

Having thus described my invention, I claim and desire to secure by Letters Patent of the United States—

1. As an improvement in axle-boxes for railway-cars, the combination of the box or casing H, provided with the half-boxing or keeper E E', with the axle A, single bearing-wheel $B^1$, set to one side of or obliquely to the axle, and shoulder-wheel $B^2$, all arranged and operating substantially in the manner and for the purpose herein shown and described.

2. The casing H, provided with the reservoirs F G and ducts $f\ g$, in combination with the friction-wheels $B^1\ B^2$ and shafts C C', substantially as and for the purpose herein shown and described.

L. H. MONTROSS.

Witnesses:
   A. N. MONTROSS,
   J. R. E. BRIDGMAN.